United States Patent

Rangan et al.

[11] Patent Number: 5,903,616
[45] Date of Patent: May 11, 1999

[54] SYNCHRONOUS CLOCK MULTIPLEXER

[75] Inventors: Geetha N. K. Rangan, Sunnyvale; Bin Guo, Fremont, both of Calif.

[73] Assignee: Advanced Micro Devices, Inc., Sunnyvale, Calif.

[21] Appl. No.: 08/727,055

[22] Filed: Oct. 8, 1996

[51] Int. Cl.[6] .................................................. H04L 7/00
[52] U.S. Cl. ............................ 375/354; 370/537; 331/49
[58] Field of Search .................................... 375/354, 356, 375/362; 370/537, 503; 340/825.02, 825.03; 331/49, 55

[56] References Cited

U.S. PATENT DOCUMENTS

| | | | |
|---|---|---|---|
| 4,853,653 | 8/1989 | Maher | 331/49 |
| 4,855,616 | 8/1989 | Wang et al. | 307/269 |
| 4,970,405 | 11/1990 | Hagiwara | 327/145 |
| 5,045,714 | 9/1991 | Park et al. | 370/357 |
| 5,231,389 | 7/1993 | Yamauchi | 331/46 |
| 5,237,573 | 8/1993 | Dhuey et al. | 370/357 |
| 5,418,407 | 5/1995 | Frenkil | 327/163 |
| 5,648,964 | 7/1997 | Inagaki et al. | 370/228 |

*Primary Examiner*—Jason Chan
*Assistant Examiner*—Congvan Tran
*Attorney, Agent, or Firm*—Fliesler, Dubb, Meyer & Lovejoy LLP

[57] ABSTRACT

A clock multiplexer including a plurality of clock selection circuits. Each clock selection circuit determines if a clock input is selected and provides the clock input to a clock output based on the determination. Each clock selection circuit further includes deselect inputs, and a select input which is coupled to a deselect output, the deselect output providing a signal indicating if the select input is active. Each deselect input is connected to a respective one of the deselect outputs from the other clock selection circuits. In each clock selection circuit, the clock input is not provided to the clock output when one of the deselect inputs is active.

17 Claims, 5 Drawing Sheets

SYNCHRONOUS CLOCK MULTIPLEXER

BACKGROUND OF THE INVENTION

1. Field of the Invention

The present invention is directed towards selecting and providing one of a plurality of clock signals.

2. Description of the Related Art

When data is retrieved from a medium, the data is often interpreted with reference to a clock. The clock provides an indication of the frequency at which the data is being provided and the instances at which the data is switched. Devices that are retrieving the data often utilize the clock when interpreting the data.

In some cases, a device may retrieve data from several mediums, and each medium may be providing data having an associated clock. The device may select to only receive data from one of these mediums at any given time.

FIG. 1 depicts a repeater set 100 in accordance with the Institute of Electrical and Electronics Engineers ("IEEE") 802.3u standard for communications networks. The IEEE 802.3u standard is set forth in *IEEE Standards for Local and Metropolitan Area Networks*: Supplement to Carrier Sense Multiple Access with Collision Detection (CSMA/CD) Access Method and Physical Layer Specifications, Media Access Control (MAC) Parameters, Physical Layer, Medium Attachment Units, and Repeater for 100 *Mb/s Operation, Type* 100*BASE-T* (*Clauses* 21–30), The Institute of Electrical and Electronics Engineers, Inc., 345 East 47th Street, New York, N.Y. 10017–2394, 1995, which is hereby incorporated by reference.

The repeater set 100 includes a repeater unit 101 coupled to a plurality of physical layer devices 102. Each of the physical layer devices 102 is coupled to a medium 103, such as a Category 5 unshielded twisted pair cable, which is typically coupled to either data terminal equipment (not shown) or another repeater set (not shown). The interface between each physical layer device 102 and medium 103 may conform to a medium dependent interface ("MDI") specified by the IEEE 802.3u standard.

Upon receiving data from a medium 103, a physical layer device 102 recovers a receive clock from the incoming receive data stream and provides the receive clock and the receive data to the repeater unit 101. The repeater unit 101 performs the function of receiving data from one of the physical layer devices 102 and retransmitting the data to each of the other physical layer devices 102 coupled to the repeater unit 101. Each of the other physical layer devices then transmits this data to its respective medium 103.

The repeater unit 101 provides transmit data to each of the physical layer devices 102 through a set of signals forming a transmit channel ($TX_1$, $TX_2$, $TX_3$, and $TX_N$). Each physical layer device 102 provides the repeater unit 101 with a set of signals forming a carrier channel ($CAR_1$, $CAR_2$, $CAR_3$, and $CAR_N$) to indicate that valid data is being received by the physical layer device 102 from its respective medium 103.

Each physical layer device 102 provides the data received from its respective medium 103 to the repeater unit 101 via a receive channel ($RX_1$, $RX_2$, $RX_3$, and $RX_N$). Each receive channel includes a receive clock signal (RX_CLK) and receive data signal (RXD). The repeater unit 101 uses the receive clock to sample the receive data from the physical layer device 102. The physical layer device 102 provides an indication signal on its carrier channel, indicating that it is providing data from a medium 103 on its receive channel. In response, the repeater unit 101 selects the receive clock from that physical layer device 102 to sample the data that is being provided on the receive channel. The repeater unit 101 then retransmits the data to all of the other coupled physical layer devices 102 for transmission to their respective mediums 103.

The IEEE 802.3u standard provides limitations on the amount of time that may elapse from an instance that incoming data arrives at the MDI of a receiving physical layer device 102 until an instance that the same data is transmitted onto the MDI's of all the other physical layer devices 102 in the repeater set 100. Accordingly, it is desirable for the repeater unit 101 to be able to rapidly select the receive clock from the receiving physical layer device 102, so that the repeater unit 101 can begin propagating the receive data through the repeater set 100.

However, the repeater unit 101 operates asynchronously with respect to the receive channel from each physical layer device 102. As a result, if the repeater unit 101 merely selects a receive clock when one is desired, the receive clock may be provided at any instance within the period of the receive clock's cycle. If this moment is close to an edge transition, the repeater unit 101 may be provided with only a small pulse (spike). Such a spike may result in a metastability or other corruption in the sampling of data from the selected receive channel. Accordingly, it is desirable for a mechanism for selecting a receive channel, including a receive clock, to provide for reducing the probability that spikes will occur in the selected receive clock.

SUMMARY OF THE INVENTION

The present invention provides for selecting a clock signal from a plurality of channels that each provide clock signals. The present invention enables a clock signal to be selected rapidly and have a reduced probability of including spikes.

The present invention includes a clock multiplexer having a plurality of clock selection circuits. Each clock selection circuit determines if a respective clock input is selected and provides the clock input to a clock output based on the determination. Each clock selection circuit further includes deselect inputs, and a select input coupled to a deselect output. The deselect output provides a signal indicating if the select input is active. Each deselect input is coupled to a respective one of the deselect outputs from the other clock selection circuits. The clock input is not provided to the clock output when one of the deselect inputs is active.

The clock multiplexer circuit is configured so that a transition from a first selected clock to a second selected clock occurs after the fall time of the first selected clock and when the second selected clock is low to avoid spikes.

In one embodiment, each clock selection circuit includes:
- a NOR gate having inputs providing the deselect inputs of the clock selection circuit and an output;
- a deselect synchronizer (or D-flip flop with limited metastability) having a data input coupled to said output of said NOR gate, a clock input coupled to said clock input of said clock selection circuit, and a data output;
- a select synchronizer having a data input forming said select input of the clock selection circuit, a clock input coupled to said clock input of the clock selection circuit, and a data output forming said deselect output of the clock selection circuit; and
- a NAND gate having a first input coupled to said data output of said deselect synchronizer, a second input coupled to said data output of said select synchronizer, a third input coupled to said clock input of the clock selection circuit, and an output forming said clock output of the clock selection circuit.

BRIEF DESCRIPTION OF THE DRAWINGS

Further details of the present invention are explained with the help of the attached drawings in which.

DETAILED DESCRIPTION

Figure 1:
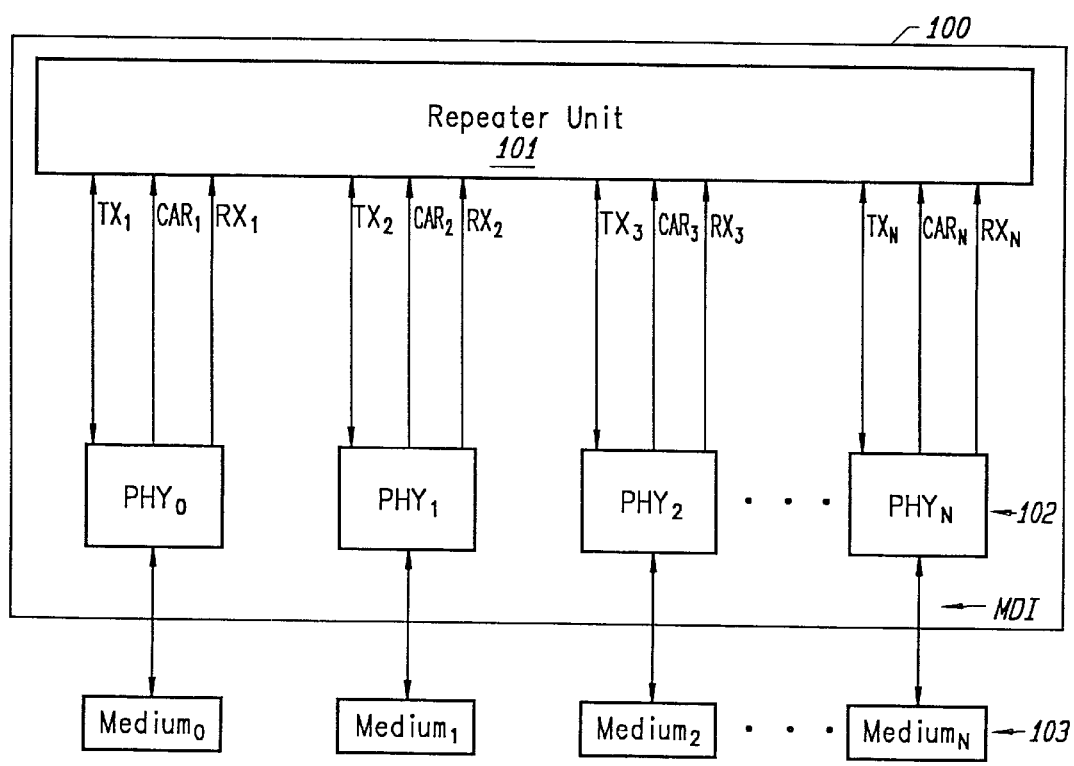
FIG. 1 illustrates a repeater set including a repeater unit and a plurality of physical layer devices.
Figure 2:
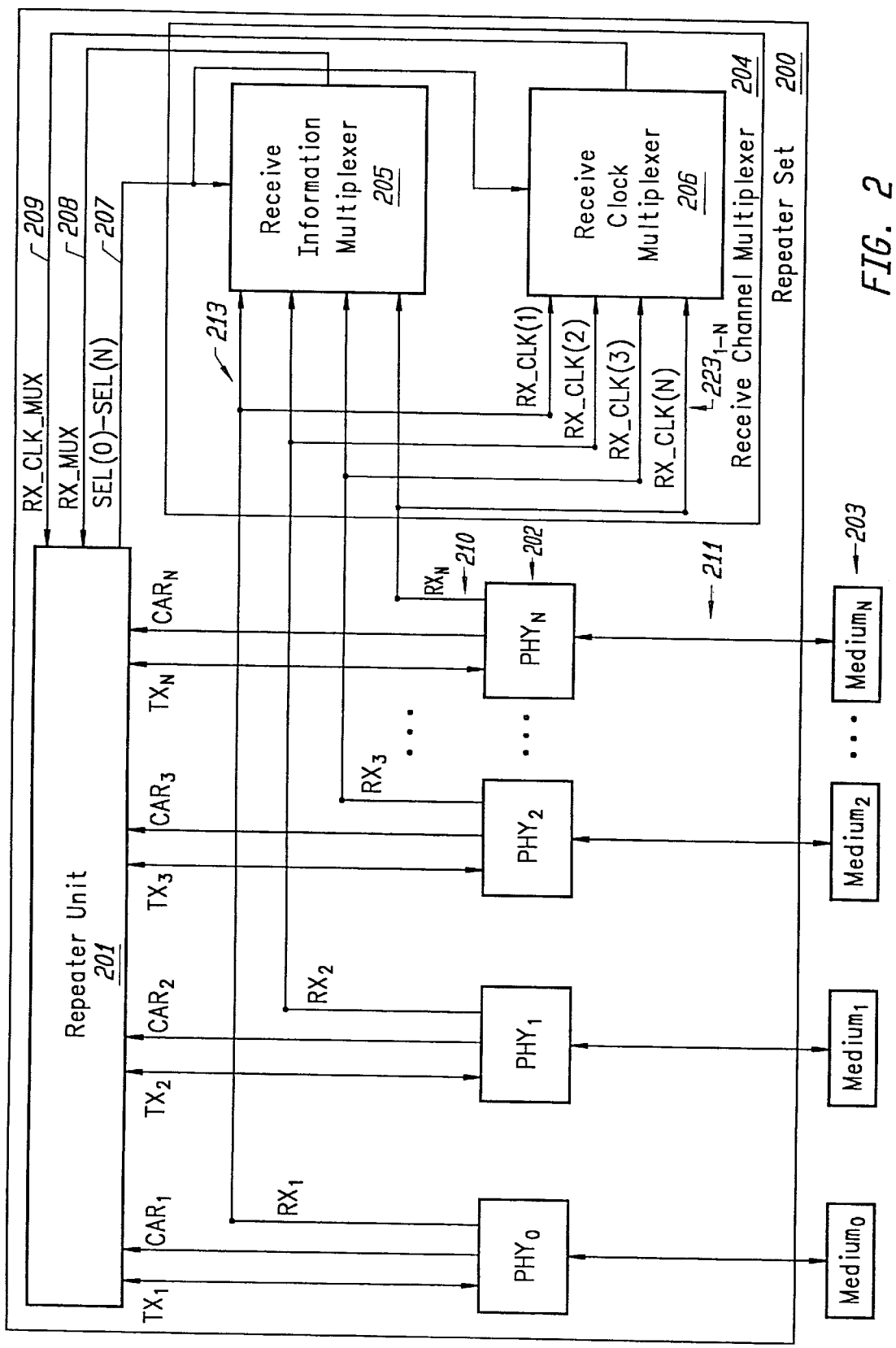
FIG. 2 illustrates a repeater set in accordance with the present invention.

FIG. 2 illustrates an IEEE 802.3u repeater set 200 in accordance with the present invention. The repeater set in FIG. 2 includes a repeater unit 201 coupled via a media independent interface ("MII") 210, as defined in the IEEE 802.3u standard, to a plurality of physical layer devices 202, which are each coupled via the MDI 211 to a respective medium 203. The transmit channel ($TX_{1-N}$) and carrier channel ($CAR_{1-N}$) for each physical layer device 202 is connected to the repeater unit 201. The receive channel ($RX_{1-N}$) for each physical layer device 202 is coupled to the repeater unit 201 through a receive channel multiplexer 204. The receive channel multiplexer 204 includes a receive information multiplexer 205 and a receive clock multiplexer 206.

The receive information multiplexer 205 has a plurality of information inputs 213, with each information input being coupled to all of the signals in a respective receive channel, except for the receive clock (RX_CLK). The receive information multiplexer 205 also includes a plurality of select inputs 207 coupled to the repeater unit 201. The repeater unit 201 provides values to the select inputs 207 to indicate the receive channel from which it desires to receive. The plurality of select inputs 207 may include a select input for each receive channel coupled to the receive information multiplexer 205. In response to the signals provided on the select inputs 207, the receive information multiplexer 205 provides the signals from a selected one of the coupled receive channels to a receive information multiplexer output (RX_MUX) 208. The receive information multiplexer output 208 is coupled to the repeater unit 201, so that the repeater unit 201 may receive the selected receive channel.

The receive clock (RX_CLK) from the receive channel of each physical layer device 202 is coupled to a respective one of a plurality of receive clock inputs $223_{1-N}$ of the receive clock multiplexer 206. All of the receive clock signals are asynchronous to each other. The receive clock multiplexer also includes the select inputs 207. Upon receiving the signals provided on the select inputs 207 by the repeater unit 201, the receive clock multiplexer 206 provides a selected receive clock from one of the receive channels to a receive clock multiplexer output (RX_CLK_MUX) 209. The receive clock multiplexer output 209 is coupled to the repeater unit 201, so that the repeater unit 201 may receive the selected receive clock. In accordance with the present invention, the receive clock multiplexer 206 provides the selected receive clock on the receive clock multiplexer output 209 rapidly and with a reduced probability of containing spikes.

Figure 3:
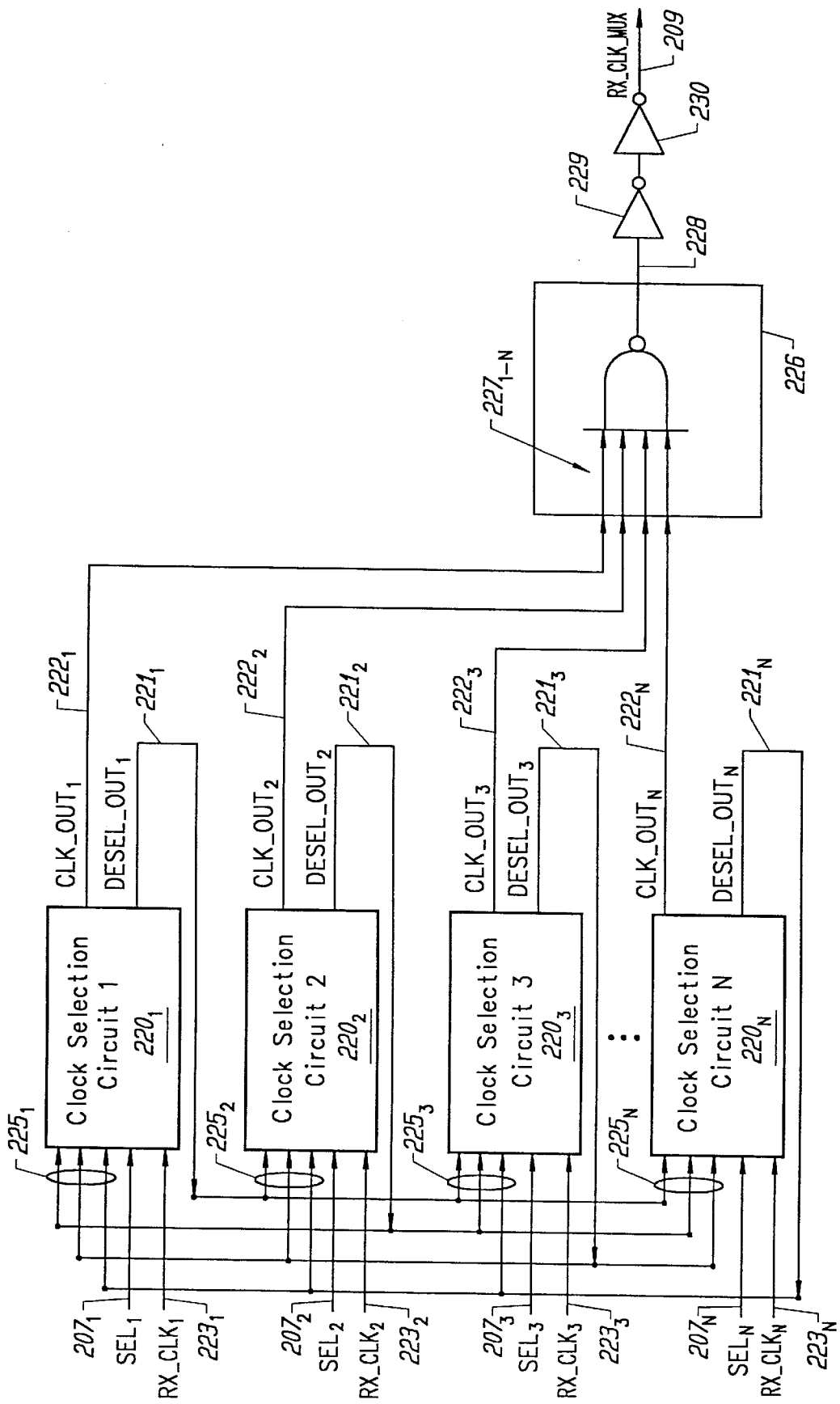
FIG. 3 illustrates the receive clock multiplexer of FIG. 2.

FIG. 3 illustrates circuitry for the receive clock multiplexer 206 of FIG. 2. The receive clock multiplexer 206 includes a clock selection circuit $220_{1-N}$ for each of the receive clocks ($RX\_CLK_{1-N}$) being provided to the receive clock multiplexer 206. Each clock selection circuit 220 includes a clock input $223_{1-N}$ coupled to one of the receive clocks provided to the receive clock multiplexer 206. Each clock selection circuit 220 also includes a respective one of the select inputs $207_{1-N}$ that receives selection signals from the repeater unit 201.

Each clock selection circuit $220_{1-N}$ has a clock output $222_{1-N}$ and a deselect output $221_{1-N}$. Each clock output $222_{1-N}$ is coupled to a respective input $227_{1-N}$ of a gate 226. The gate 226 masks all of the clock outputs $222_{1-N}$, except for a clock output 222 providing a clock signal. The gate 226 provides an inversion of such a clock output 222 on an output 228.

The signal provided at the gate's output 228 is the signal provided on the receive clock multiplexer output 209 (RX_CLK_MUX). In one embodiment of the present invention, the gate's output 228 forms the receive clock multiplexer output 209. In an alternate embodiment of the present invention, the gate's output 228 may be coupled to a series of inverters 229 and 230 and/or buffers (not shown) to strengthen the selected receive clock signal before it is provided to the repeater unit 201. In such an embodiment, the output of the series of inverters 229 and 230 and/or buffers (not shown) forms the receive clock multiplexer output 209. The gate 226 may be a NAND gate having N number of inputs, with each of the N inputs being coupled to a respective clock output $222_{1-N}$.

Each clock selection circuit 220 includes a set of deselect inputs $225_{1-N}$. Each deselect input is coupled to a respective one of the deselect outputs $221_{1-N}$ from the clock selection circuits $220_{1-N}$ other than the clock selection circuit 220 including the set of deselect inputs 225. For example, the first clock selection circuit $220_1$ includes a set of deselect inputs $225_1$. Each of the deselect outputs $221_{2-N}$ from the other clock selection circuits $220_{2-N}$ is coupled to a respective one of the deselect inputs in the first set of deselect inputs $225_1$.

In operation, each clock selection circuit $220_{1-N}$ will provide a constant logic value on its respective clock output $222_{1-N}$, when the clock selection circuit $207_{1-N}$ detects that either its select input $224_{1-N}$ is not asserted or one of the inputs in its set of deselect inputs 225 is asserted. Additionally, each clock selection circuit $220_{1-N}$ will couple the signal on its clock input $223_{1-N}$ to its clock output $222_{1-N}$, when the clock selection circuit $220_{1-N}$ detects that its select input $207_{1-N}$ is asserted and all of the deselect inputs in its set of deselect inputs $225_{1-N}$ are not asserted.

When one clock output 222 provides a selected clock signal and the other clock outputs 222 provide a constant logic value, the selected receive clock is placed on the gate's output 228. When the gate 226 is a NAND gate, the constant logic value provided on the clock outputs 222 may be a logic 1 value.

Figure 4:
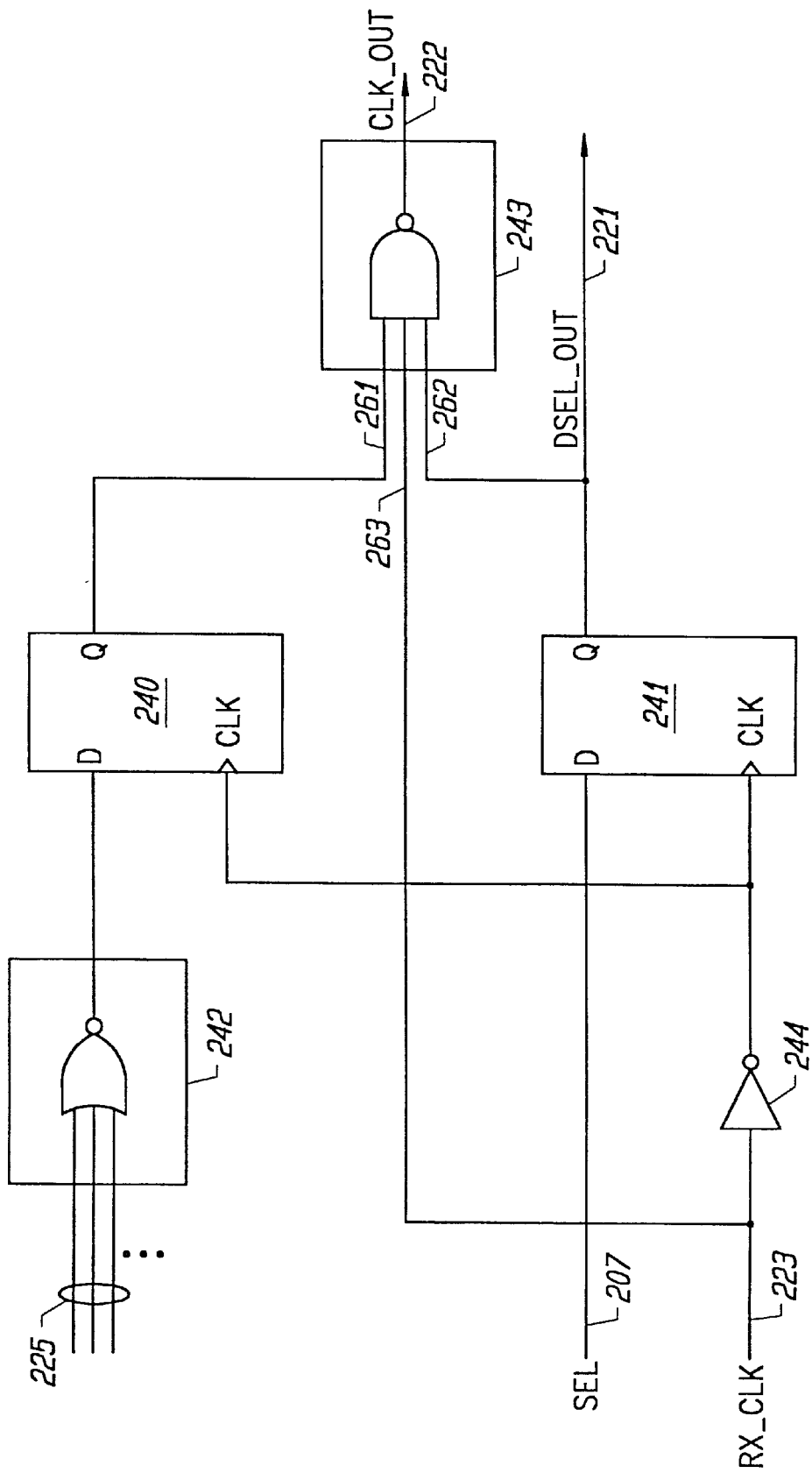
FIG. 4 illustrates one embodiment of circuitry for the clock selection circuits of the receive clock multiplexer in FIG. 3.

FIG. 4 illustrates circuitry that is employed in each of the clock selection circuits $220_{1-N}$ of FIG. 3. Each clock selection circuit 220 includes a first gate 242, a second gate 243, a deselect synchronizer 240, and a select synchronizer 241.

The first gate 242 has inputs, with each input forming a deselect input in a set of deselect inputs 225 for a respective clock selection circuit 220. An output of the first gate 242 in a clock selection circuit 220 is asserted to a logic 1 value if all of the deselect outputs 221 from each of the other clock selection circuits are deasserted to a logic 0 value. The output of the first gate 242 in a clock selection circuit 220 is deasserted to a logic 0 value if any one of the deselect outputs 221 of the other clock selection circuits is asserted to a logic 1 value. The first gate 242 may be a NOR gate.

The output of the first gate 242 is coupled to a data input (D) of a deselect synchronizer 240, so that this output can be synchronized with the receive clock. The clock input 223 is coupled to a clock input (CLK) of the deselect synchronizer 240 through an inverter 244. An output (Q) of the deselect synchronizer 240 is coupled to a first input 261 of the second gate 243. The deselect synchronizer 240 operates functionally the same as a D/Q flip-flop. On the rising edge of a signal at the deselect synchronizer's clock input (CLK), the signal appearing at the data input (D) of the deselect synchronizer 240 is latched and provided at the deselect synchronizer's output (Q).

Figure 5:
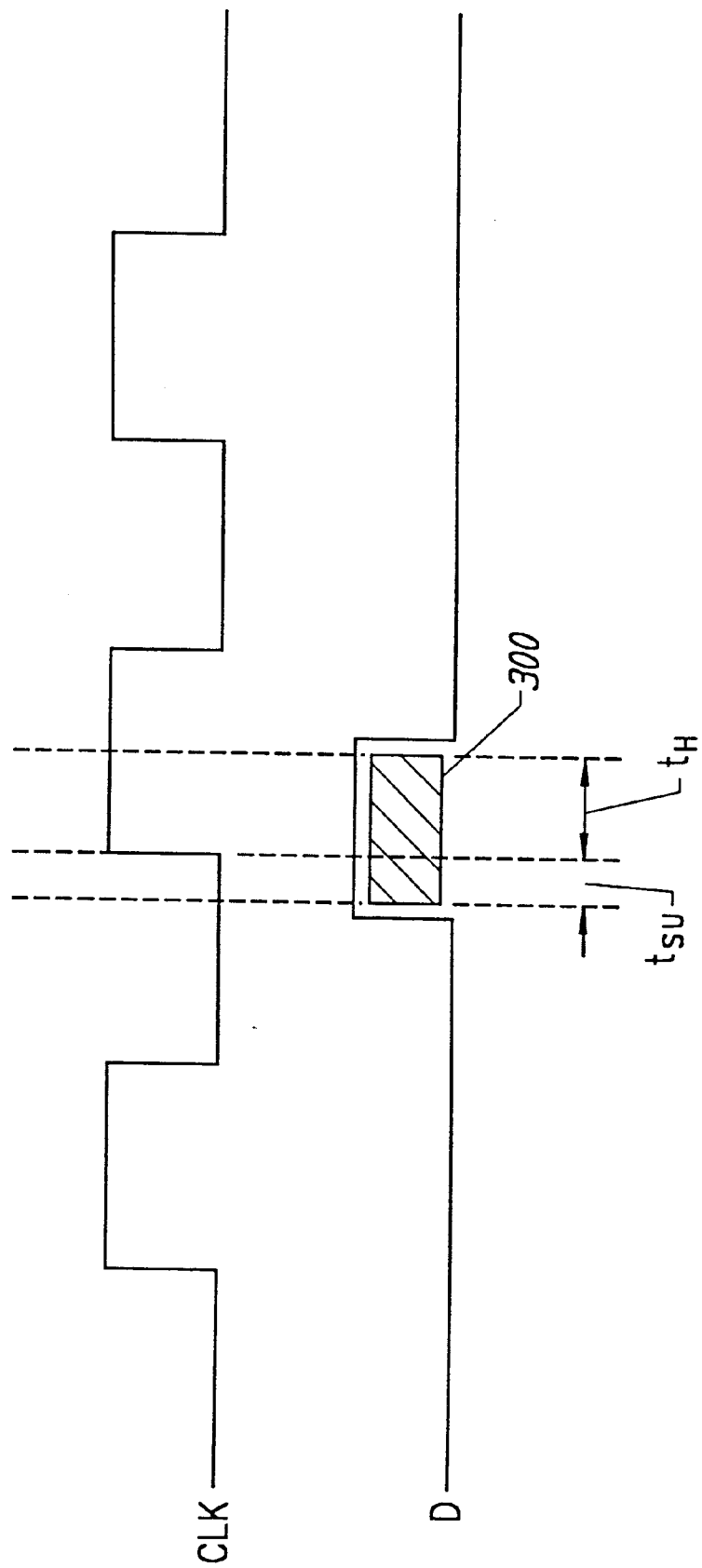
FIG. 5 illustrates an uncertainty window for a synchronizer that may be employed in the clock selection circuit shown in FIG. 4.

The deselect synchronizer 240 is different from a traditional D/Q flip flop, because it has an uncertainty window ranging between 10–20 picoseconds. The uncertainty window is depicted in FIG. 5. The uncertainty window 300 is defined by the set-up time ($t_{SU}$) and the hold time ($t_H$) of the data input (D) to the deselect synchronizer 240 with respect to the clock input (CLK) of the deselect synchronizer 240. The uncertainty window 300 represents the period of time during which the data input signal (D) to the deselect synchronizer 240 must be stable to ensure that a metastable condition will not occur at the output (Q) of the deselect synchronizer 240.

A small uncertainty window 300 of 10–20 picoseconds significantly reduces the probability of having a metastable condition occur at the output of the deselect synchronizer 240. This in turn significantly reduces the probability of having a metastable condition occur at the clock output 222 of the clock selection circuit 220, thereby causing a metastable condition at the receive clock multiplexer output 209 (RX_CLK_MUX).

In a traditional D/Q flip flop, the uncertainty window may be between 10–20 nanoseconds. This provides an unacceptable risk of providing a metastable condition on the deselect synchronizer's output, since the signals presented on the set of deselect inputs 225 originate from signals on the select inputs $207_{1-N}$, which are all asynchronous to the clock input (CLK) of the deselect synchronizer 240. In order to mitigate the metastability risk of traditional D/Q flip flops, traditional solutions have connected the input of a second D/Q flip flop to the output of a first D/Q flip flop. The clock input of the second D/Q flip flop is coupled to the clock input of the first D/Q flip flop. The output of the second flip flop is then used in place of the first flip flop's output. The second flip flop's output is less likely to be in a metastable condition, because the output of the first flip flop has an entire clock period to settle before being sampled by the second flip flop.

However, the traditional solution of employing two serially connected flip flops is not desirable in applications where an output is needed rapidly. The use of the second flip flop delays the resulting output by an entire clock period. In the case of the receive clock multiplexer 206, as stated previously, it is desirable to rapidly provide a receive clock multiplexer output 209. In order to rapidly provide this output, it is desirable to rapidly resolve internal logic signals through the use of the deselect synchronizer 240, instead of two flip flops.

The select synchronizer 241 is functionally equivalent to the deselect synchronizer 240 and has an uncertainty window 300 equivalent to the uncertainty window 300 of the deselect synchronizer 240. The select synchronizer 241 may be the same as the deselect synchronizer 240. A data input (D) of the select synchronizer 241 is coupled to the select input 207, to synchronize the signal on the select input 207 to the clock input 223. A clock input (CLK) of the select synchronizer 241 is coupled to the clock input 223 through an inverter 244. An output (Q) of the select synchronizer 241 is coupled to a second input 262 of the second gate 243. The output of the select synchronizer 241 also forms the deselect output 221.

Each second gate 243 includes a third input 263 coupled to the clock input 223. An output of the second gate 243 forms the clock output 222. Each second gate 243 operates to provide a constant logic value on the clock output 222 when either the first input 261 or the second input 262 is not asserted. When both the first input 261 and the second input 262 of the second gate 243 are asserted, the output of the second gate 243 provides a signal reflecting the signal on the third input 263 of the second gate 243. The second gate 243 may be a NAND gate having three inputs and an output.

In operation, a clock selection circuit 220 provides an inversion of the signal on its clock input 223 at its clock output 222, when its select input 207 is asserted to a logic 1 and its set of deselect inputs 225 are all deasserted to a logic 0. Otherwise, the clock output 222 is provided with a logic 1, once the signal on the clock input 223 is driven to a logic 0.

When the repeater unit 201 asserts a select signal to a logic 1, it is received by the select input 207 of one of the clock selection circuits 220. All of the other clock selection circuits receive a logic 0 on their respective select input 207. On the falling edge of each receive clock signal (RX_CLK) being provided to the clock inputs $223_{1-N}$, the value on each of the respective select inputs $2_{1-N}$ is stored in a respective one of the select synchronizers $241_{1-N}$ This sets a value for each of the deselect outputs $221_{1-N}$. The second input 262 to each of the second gates $243_{1-N}$ is thereby set to the same value as the respective deselect output $221_{1-N}$ If the second input 262 is a logic 0, the clock output 222 of the clock selection circuit 220 is held at a logic 1.

Each one of the first gates $242_{1-N}$ performs a NOR logic function to the respective set of deselect inputs $225_{1-N}$ The result of the NOR logic function is provided to the input (D) of a respective deselect synchronizer $240_{1-N}$. If any of the deselect inputs in the set of deselect inputs 225 is a logic 1, the input (D) to the deselect synchronizer 240 will be a logic 0. Otherwise, the input to the deselect synchronizer 240 will be set to a logic 1.

On the falling edge of each receive clock signal (RX_CLK) on each clock input $223_{1-N}$, the value at each of the respective deselect synchronizer's inputs is stored in the respective deselect synchronizer $240_{1-N}$. This causes the first input 261 to each of the second gates $243_{1-N}$ to receive the value of the output of the respective first gate $242_{1-N}$. If this value is a logic 0 the output of the respective second gate $243_{1-N}$ will be held at a logic 1. If this value is a logic 1 and the second input 262 to the second gate $243_{1-N}$ is a logic 1, an inversion of the signal on the respective clock input $223_{1-N}$ will appear on the output of the respective second gate $243_{1-N}$.

All of clock outputs $222_{1-N}$ have a NAND function performed on them by gate 226. The resulting output signal of gate 226 is coupled to the repeater unit 201 as the receive clock multiplexer output 209 (RX_CLK_MUX).

As a result of synchronizing the select inputs $207_{1-N}$ and the NOR of each set of deselect inputs $225_{1-N}$, the probability of providing a receive clock multiplexer output 209 without spikes is greatly increased. Since the select inputs $207_{1-N}$ provide signals that are asynchronous to the receive clocks (RX_CLK) on the clock inputs $223_{1-N}$, the selection of a receive clock without synchronization may result in one receive clock being placed on the receive clock multiplexer output 209 at any instance within the receive clock's period. The synchronization provided in embodiments of the present invention, by each deselect synchronizer 240 and each select synchronizers 241, provides for a clean transition between receive clocks to occur as follows. First, a set of signals is provided to the select inputs $207_{1-N}$ by the repeater unit 201. Second, the receive clock multiplexer output 209 is placed in a logic 0 state by the previously selected receive clock making a transition from a logic 1 to a logic 0. Third, the receive clock multiplexer output 209 remains at logic 0, until each clock selection circuit $220_{1-N}$ determines whether it is to supply the newly selected receive clock.

As described above, this determination is made by:
1. sampling the select input 207 and NOR of the set of deselect inputs 225; and
2. on the basis of the sampled values either providing a constant logic value on the clock output 222 or passing an inversion of the signal on the clock input 223 to the clock output 222.

By using the sampled values, the newly selected receive clock will begin to be provided on the receive clock multiplexer output 209 at almost the beginning of the logic 0 low portion of its cycle. This helps to ensure that the receive clock multiplexer output 209 will not experience either a logic 0 or logic 1 spike in the transition between receive clock signals. As stated above, the use of synchronizers instead of traditional flip flops also aids in preventing spikes by reducing the probability of metastability.

In accordance with the present invention, the receive clock multiplexer 206 is not limited to use with a repeater set 202. The receive clock multiplexer 206 may be employed in any application where a device is selecting between a plurality of clock signals.

Although the invention has been described above with particularity, this was merely to teach one of ordinary skill in the art to make and use the invention. Many modifications will fall within the scope of the invention, as that scope is defined by the following claims.

What is claimed is:

1. A clock multiplexer comprising:
    a plurality of clock selection circuits, each for determining if a clock input is selected and providing the clock input to a clock output based on the determination, each clock selection circuit having a clock input, a select input, a clock output, a deselect output and deselect inputs,
        wherein each of said deselect inputs is connected to a respective one of the deselect outputs from the other clock selection circuits,
        wherein the clock input is not provided to the clock output when one of the deselect inputs is active, and
        wherein said deselect output provides a signal indicating if the select input is active, and said signal provided by said deselect output is independent of any signals on said deselect inputs.

2. The clock multiplexer of claim 1, wherein a transition from providing a clock output of a first one of the plurality of clock selection circuits to providing a clock output of a second one of the plurality of clock selection circuits occurs after a falling edge on the clock input of the first one of the plurality of clock selection circuits and during a low cycle on the clock input of the second one of the plurality of clock selection circuits.

3. The clock multiplexer of claim 1, wherein each said clock selection circuit includes:
    a NOR gate having inputs providing the deselect inputs of the clock selection circuit and an output;
    a deselect register having a data input coupled to said output of said NOR gate, a clock input coupled to said clock input of said clock selection circuit, and a data output;
    a select register having a data input forming said select input of the clock selection circuit, a clock input coupled to said clock input of the clock selection circuit, and a data output forming said deselect output of the clock selection circuit; and
    a NAND gate having a first input coupled to said data output of said deselect register, a second input coupled to said data output of said select register, a third input coupled to said clock input of the clock selection circuit, and an output forming said clock output of the clock selection circuit.

4. The clock multiplexer of claim 3, wherein said deselect register is a synchronizer, and said select register is a synchronizer.

5. The clock multiplexer of claim 3, wherein said clock input of said deselect register is coupled to said clock input of said clock selection circuit through an inverter, and wherein said clock input of said select register is coupled to said clock input of said clock selection circuit through an inverter.

6. A clock selection circuit receiving deselect inputs, a select input, and a clock input and providing a clock output, the clock selection circuit comprising:
    a first gate having inputs connected to the deselect inputs and providing an output indicating whether all of the deselect inputs are deasserted;
    a first register having a data input coupled to said output of the first gate, a clock input coupled to said clock input of the clock selection circuit, and a data output;
    a second register having a data input forming said select input, a clock input coupled to said clock input of the clock selection circuit, and a data output; and
    a second gate, including a first input coupled to said data output of said first register, a second input coupled to said data output of said second register, a third input coupled to the clock input of the clock selection circuit, and an output providing said clock output of the clock selection circuit, the second gate for providing the clock output based on the clock input of the clock selection circuit when the data output of the first register and the data output of the second register are both asserted.

7. The clock selection circuit of claim 6, wherein said first gate is a NOR gate.

8. The clock selection circuit of claim 6, wherein said second gate is a NAND gate.

9. The clock selection circuit of claim 6, wherein said first register is a synchronizer.

10. The clock selection circuit of claim 9, wherein said second register is a synchronizer.

11. The clock selection circuit of claim 6, wherein said clock input of the clock selection circuit is coupled to said first register clock input through an inverter.

12. The clock selection circuit of claim 11, wherein said clock input of the clock selection circuit is coupled to said second register clock input through said inverter.

13. An apparatus comprising:

a plurality of physical layer devices, each for transmitting information onto a communications network and receiving information from the communications network, each physical layer device including a transmit channel for transmitting information, a carrier channel for sensing and indicating a reception of information, and a receive channel for receiving information, wherein each receive channel has a receive clock output;

a plurality of clock selection circuits, each for determining if a clock input is selected and providing the clock input to a clock output based on the determination, each clock selection circuit having a clock input coupled to the receive clock output of a respective one of the physical layer devices, a select input, a clock output, a deselect output and deselect inputs, wherein each of said deselect inputs is connected to a respective one of the deselect outputs from the other clock selection circuits, wherein the clock input is not provided to the clock output when one of the deselect inputs is active, and wherein said deselect output provides a signal indicating if the select input is active, and said signal provided by said deselect output is independent of any signals on said deselect inputs.

14. The apparatus of claim 13, further including:

an output for providing a clock output of one of said plurality of clock selection circuits; and a repeater unit having a receive channel, including a receive clock input coupled to said output of said apparatus.

15. The apparatus of claim 14, wherein each said clock selection circuit includes:

a first gate having inputs connected to the deselect inputs and providing an output indicating whether all of the deselect inputs are deasserted;

a first register having a data input coupled to said output of the first gate, a clock input coupled to said clock input of the clock selection circuit, and a data output;

a second register having a data input forming said select input, a clock input coupled to said clock input of the clock selection circuit, and a data output; and a second gate, including a first input coupled to said data output of said first register, a second input coupled to said data output of said second register, a third input coupled to the clock input of the clock selection circuit, and an output providing said clock output of the clock selection circuit, the second gate for providing the clock output based on the clock input of the clock selection circuit when the data output of the first register and the data output of the second register are asserted.

16. The apparatus of claim 15, wherein said deselect register is a synchronizer.

17. The apparatus of claim 16, wherein said select register is a synchronizer.

* * * * *